(12) United States Patent
Fujisawa et al.

(10) Patent No.: US 7,044,609 B2
(45) Date of Patent: May 16, 2006

(54) LIGHT SOURCE DEVICE AND PROJECTOR (75) Inventors: Shohei Fujisawa, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 10/806,124

(22) Filed: Mar. 23, 2004

(65) Prior Publication Data

US 2004/0246452 A1    Dec. 9, 2004

(30) Foreign Application Priority Data

Mar. 25, 2003  (JP) .............................. 2003-082921
Sep. 19, 2003  (JP) .............................. 2003-327238

(51) Int. Cl.
- G03B 21/28 (2006.01)
- F21V 7/00 (2006.01)
- G02F 1/1335 (2006.01)
- H01J 5/16 (2006.01)

(52) U.S. Cl. .................... 353/99; 353/37; 362/302; 362/346; 362/347; 349/67; 313/114

(58) Field of Classification Search ................ 353/99, 353/98, 85, 30, 31, 33, 34, 37; 362/257, 362/296–298, 300–302, 304, 305, 310, 341, 362/346, 347, 350; 349/7, 8, 61, 62, 67; 313/113, 114

See application file for complete search history.

(56) References Cited

U.S. PATENT DOCUMENTS 5,479,065 A * 12/1995 Sugimoto et al. ............ 313/113
6,351,058 B1 * 2/2002 Roberts ....................... 313/113

FOREIGN PATENT DOCUMENTS

| JP | H1-75233 U   | 5/1989  |
| JP | 06-75222 A   | 3/1994  |
| JP | 06-203806 A  | 7/1994  |
| JP | A 6-203806   | 7/1994  |
| JP | 3004793 U    | 9/1994  |
| JP | 06-289394 A  | 10/1994 |
| JP | 08-273401 A  | 10/1996 |
| JP | A 9-120067   | 5/1997  |

(Continued)

*Primary Examiner*—W. B. Perkey
*Assistant Examiner*—Rochelle Blackman
(74) *Attorney, Agent, or Firm*—Oliff & Berridge, PLC (57) ABSTRACT

A light source device includes: a light-emitting tube including a light-emitting portion that generates a light beam by an electric discharge between electrodes and sealing portions provided on both sides of the light-emitting portion; a reflector including a neck portion provided with an insertion hole to which the light-emitting tube is inserted, and a reflecting portion integrally formed with the neck portion and having an ellipsoidal curved reflecting surface that irradiates forward the light beam emitted by the light-emitting portion and aligns the light beam in a predetermined direction. The light-emitting tube has a sub-reflection mirror that covers substantially front half of the light-emitting tube. The insertion hole has a diameter that is enlarged from the base end thereof toward the distal end in a light irradiation direction. The opening diameter of the insertion hole on the side of the reflecting surface is greater than the external diameter of the sub-reflection mirror while the opening internal diameter is within the diameter of a valid reflection area of the reflector, the diameter being defined by a front focal position of the reflector and the outer periphery of the sub-reflection mirror.

2 Claims, 6 Drawing Sheets

FOREIGN PATENT DOCUMENTS

| JP | 09-259817 A | 10/1997 |
| JP | 11-143378 A | 5/1999 |
| JP | 2002-62586 A | 2/2002 |
| JP | A 2002-062586 | 2/2002 |

* cited by examiner

LIGHT SOURCE DEVICE AND PROJECTOR

BACKGROUND OF THE INVENTION

1. Field of the Invention

The present invention relates to a light source device that has: a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion aligns the light beam in a predetermined direction, as well as to a projector.

2. Description of Related Art

Conventionally, projectors that modulate a light beam irradiated by a light source in accordance with image information to project an optical image in an enlarged manner have been used for the purpose of presentation at conferences etc in conjunction with personal computers. Besides, such projectors are recently used for the purpose of home-theater for serving the needs of watching movies etc. on a wide screen at home.

The known light source device used for the projector is that houses an electric discharge light-emitting tube such as a metal halide lamp or high-pressure mercury lamp and a reflector in a lamp housing etc. by integrating each other.

The light-emitting tube, or a high-pressure mercury lamp for instance, has a light-emitting portion in which a pair of tungsten electrodes spaced apart by a predetermined distance, mercury, rare gas and a small amount of halogen are sealed, and sealing portions provided on both sides of the light-emitting portion with molybdenum foils electrically connected to the electrodes inserted and sealed by glass material etc.

The reflector has a neck portion with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermine direction.

When the light-emitting tube and the reflector are integrated, the sealing portion of the light-emitting tube is inserted to the insertion hole of the reflector, positioned so that the light-emitting portion is positioned at a predetermined position inside the reflector, and consequently the light-emitting tube can be fixed inside the reflector by curing a silica-alumina inorganic adhesive after filling it from the side of the base end of the insertion hole to the part between the insertion hole and the sealing portion.

Note that, it would be difficult to fill the inorganic adhesive if the gap between the insertion hole and the sealing portion is too small whereas the inorganic adhesive would be overflowed from the gap to the reflecting surface of the reflector if the gap is too large.

Therefore, such configuration is conventionally suggested that a narrow part is formed on the insertion hole of the reflector at a part adjacent to the reflecting surface, so that the inorganic adhesive does not overflow to the reflecting surface (see JP2002-62586A, JP6-203806A).

However, in the above prior arts according to the above references, the filling of the inorganic adhesive from the side of the reflecting surface may be difficult when the opening diameter of the insertion hole on the side of the reflecting surface of the reflector is small.

Additionally, in the narrow part of the above prior arts according to the above references, it is difficult to completely eliminate the gap between the light-emitting tube and the insertion hole. Thus, if the adhesive adheres on the reflecting surface of the reflector, a reflection film thereof would be corroded.

An object of the present invention is to provide a light source device that makes an adhesive to be easily filled to an insertion hole of a neck portion of a reflector but not to be adhered on a reflecting surface of the reflector, as well as a projector.

SUMMARY OF THE INVENTION

A light source device according to an aspect of the present invention includes: a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction, in which the light-emitting tube has a sub-reflection mirror that covers substantially front half of the light-emitting portion, in which the insertion hole has a diameter that is enlarged from the base end thereof toward the distal end in a light irradiation direction, and in which the opening diameter of the insertion hole on the side of the reflecting surface is greater than the external diameter of the sub-reflection mirror while the opening diameter is within the internal diameter of a valid reflection area of the reflector, the internal diameter being defined by a front focal position of the reflector and the outer periphery of the sub-reflection mirror.

The internal diameter of the valid reflection area of the reflector is decided by a second focal position of the ellipsoidal reflector and the external diameter of the sub-reflection mirror, which is defined as a diameter of a circle, or a nodal line between the line connecting the second focal position and the outer periphery of the sub-reflection mirror, and the reflecting surface of the ellipsoidal reflector.

With this arrangement, the opening diameter of the insertion hole on the side of the reflecting surface is greater than the external diameter of the sub-reflection mirror while the opening diameter is set within the internal diameter of the valid reflection area of the reflector, so that the adhesive can be filled from the sufficiently large opening diameter. Accordingly, the adhesive can easily be filled from the side of the reflecting portion of the reflector, and thus it is possible to fill the adhesive by inserting a jig or the like.

Since the large opening diameter enhances the visibility, the adhesive can be filled from the side of the reflecting surface, or from the rear side of the reflector while checking its filling amount, thus preventing the adhesive from overflowing to and adhering on the reflecting surface of the reflecting portion of the reflector.

Further, since the opening diameter of the insertion hole is greater than the external diameter of the sub-reflection mirror and is set within the internal diameter of the valid reflection area of the reflector, the amount of the light beam irradiated by the light source device would not be reduced due to the reduction in size of the reflecting surface of the reflector.

A projector according to another aspect of the present invention includes: a light source device; an optical modulator that modulates a light beam irradiated by the light source device in accordance with image information to form an optical image; and a projection optical device that projects the optical image formed by the optical modulator in an enlarged manner, in which the light source device includes: a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion and aligns the light beam in a predetermined direction, in which the light-emitting tube has a sub-reflection mirror that covers substantially front half of the light-emitting portion, in which the insertion hole has a diameter that is enlarged from the base end thereof toward the distal end in a light irradiation direction, and in which the opening diameter of the insertion hole on the side of the reflecting surface is greater than the external diameter of the sub-reflection mirror while the opening diameter is within the internal diameter of a valid reflection area of the reflector, the internal diameter being defined by a front focal position of the reflector and the outer periphery of the sub-reflection mirror.

With this arrangement, since not only the reflecting surface of the reflecting portion of the reflector would not be damaged, but also the amount of the irradiated light beam would not be reduced, the projector may provide a bright and high-resolution projection image.

DETAILED DESCRIPTION OF PREFERRED EMBODIMENT(S)

An embodiment of the present invention will be described below with reference to the attached drawings.

Figure 1:
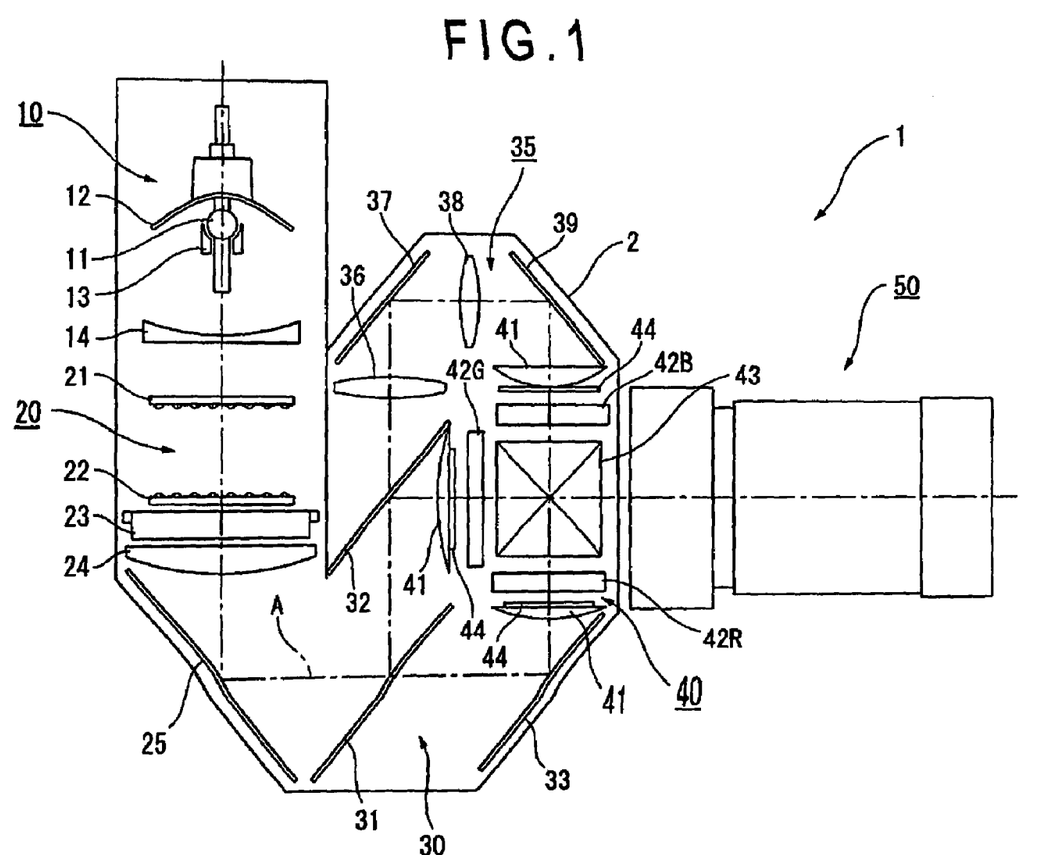
FIG. 1 is a schematic illustration showing the structure of an optical system of a projector according to an embodiment of the present invention.

FIG. 1 is a schematic illustration showing an optical system of a projector 1 according to an embodiment of the present invention. The projector 1 is an optical equipment that modulates a light beam irradiated by a light source in accordance with image information to form an optical image, and projects the optical image on a screen in an enlarged manner, the projector 1 including a light source lamp unit 10 (light source device), an integrator illuminating optical system 20, a color-separating optical system 30, a relay optical system 35, an optical device 40 and a projection optical system 50. The optical elements of the optical systems 20, 30 and 35 are positioned and housed in a light guide 2 in which a predetermined illumination optical axis A is set.

The light source lamp unit 10 that irradiates a light beam emitted by a light source lamp 11 forward and aligns the light beam in a predetermined direction to illuminate the optical device 40, though described below in detail, includes the light source lamp 11, an ellipsoidal reflector 12, a sub-reflection mirror 13 and a parallelizing concave lens 14.

The light beam emitted by the light source lamp 11 is irradiated toward the front side of the device as a convergent light so that the irradiation direction thereof being aligned by the ellipsoidal reflector 12, the convergent light being parallelized by the parallelizing concave lens 14, and irradiated to the integrator illuminating optical system 20.

The integrator illuminating optical system 20 that splits the light beam irradiated by the light source lamp unit 10 into a plurality of sub-beams to integrate the in-plane luminance of an illumination area, includes a first lens array 21, a second lens array 22, a PBS array 23, a superposition lens 24 and a reflection mirror 25.

The first lens array 21 is a light-beam splitting optical element for splitting the light beam irradiated by the light source lamp 11 into a plurality of sub-beams, which includes a plurality of small lenses arranged in a matrix in a plane orthogonal to the illumination optical axis A, the profile of the respective small lenses being substantially similar to the shape of each image formation area of liquid crystal panels 42R, 42G and 42B of the optical device 40 (described below).

The second lens array 22 is an optical element for condensing the plurality of sub-beams split by the first lens array 21 and also includes a plurality of small lenses arranged in a matrix in a plane orthogonal to the illumination optical axis A in the same manner as the first lens array 21. However, since the second lens array 22 is dedicated to condense the sub-beams, it is not necessary that the profile of the respective small lenses thereof corresponds to the profile of the image formation area of the liquid crystal panels 42R, 42G and 42B.

The PBS array 23 is a polarization-converting element for aligning the polarization direction of the respective sub-beams split by the first lens array 21 into a uniform linear polarization light.

Though not illustrated, the PBS array 23 has an alternating arrangement of polarization separating films and reflection mirrors inclined relative to the illumination optical axis A. The polarization separating film transmits one of P polarized light beam and S polarized light beam contained in the respective sub-beams and reflects the other polarized light beam. The reflected other polarized light beam is bent by the reflection mirror and is irradiated in the irradiation direction of the transmitted one polarized light beam, i.e. along the illumination optical axis A. Either one of the irradiated polarized light beams is polarization-converted by a phase plate provided on the light-irradiation surface of the PBS array 23 so that the polarization direction of all of the polarized light beams are aligned. With the use of the PBS array 23, the light beam irradiated by the light source lamp 11 can be aligned in a uniform polarized light beam, thereby enhancing the utilization ratio of the light source beam used in the optical device 40.

The superposition lens 24 is an optical element for condensing the plurality of sub-beams having passed through the first lens array 21, the second lens array 22 and the PBS array 23 to superpose the sub-beams on the image formation areas of the liquid crystal panels 42R, 42G and 42B. The superposition lens 24 is an aspherical lens having a flat surface on the incident side of the light-transmission area and also having a hyperboloid surface on the irradiation side in the present embodiment, but may alternatively be a spherical lens.

The light beam irradiated by the superposition lens 24 is bent by the reflection mirror 25 to be irradiated to the color-separating optical system 30.

The color-separating optical system 30, which has two dichroic mirrors 31 and 32, and a reflection mirror 33, separates the plurality of sub-beams irradiated by the integrator illuminating optical system 20 by the dichroic mirrors 31 and 32 into three color lights of red (R), green (G) and blue (B).

The dichroic mirrors 31 and 32 are optical elements having a base on which a wavelength-selection film that reflects a light beam of a predetermined wavelength and transmits a light beam of the other wavelength is formed, in which the dichroic mirror 31 disposed on the upstream of the optical path is a mirror that transmits the red light and reflects the other color lights. The dichroic mirror 32 disposed on the downstream of the optical path is a mirror that reflects the green light and transmits the blue light.

The relay optical system 35 has an incident-side lens 36, a relay lens 38, and reflection mirrors 37 and 39 to guide the blue light transmitted through the dichroic mirror 32 of the color-separating optical system 30 to the optical device 40. Incidentally, the relay optical system 35 is used for the optical path of the blue light in order to avoid deterioration in the light utilization efficiency on account of light dispersion and the like caused by the longer length of the optical path of the blue light than the optical path of other color lights. Though such arrangement is used in the present embodiment because of the longer optical path of the blue light, the optical path of the red light may alternatively be lengthened.

The red light separated by the above-described dichroic mirror 31 is bent by the reflection mirror 33 and, subsequently, fed to the optical device 40 through a field lens 41. The green light separated by the dichroic mirror 32 is directly fed to the optical device 40 through the field lens 41. The blue light is condensed and bent by the lenses 36, 38 and the reflection mirrors 37, 39 of the relay optical system 35 to be fed to the optical device 40 through the field lens 41. Incidentally, the field lenses 41 provided on the upstream of the optical path of the respective color lights of the optical device 40 are provided for converting the respective sub-beams irradiated by the second lens array 22 into light beams parallel to the illumination optical axis.

The optical device 40 modulates the light beam incident thereon in accordance with image information to form a color image, the optical device 40 including the liquid crystal panels 42R, 42G and 42B as an optical modulator to be illuminated and a cross dichroic prism 43 (color-combining optical system). Incidentally, incident-side polarization plates 44 are interposed between the field lens 41 and the respective liquid crystal panels 42R, 42G and 42B and, though not illustrated, irradiation-side polarization plates are interposed between the respective liquid crystal panels 42R, 42G and 42B and the cross dichroic prism 43. The incident-side polarization plates 44, the liquid crystal panels 42R, 42G and 42B and the irradiation-side polarization plates modulate the respective incident color lights.

The liquid crystal panels 42R, 42G and 42B are constructed by sealing liquid crystal (electrooptic material) between a pair of transparent glass substrates, which modulates the polarization direction of the polarized light beam irradiated by the incident-side polarization plate 44 in accordance with given image signal using, for instance, polycrystalline silicon TFT as a switching element. The image formation areas of the liquid crystal panels 42R, 42G and 42B have rectangular profile having diagonal dimension of, for instance, 0.7 inch.

The cross dichroic prism 43 is an optical element for combining the optical image modulated for each color light and irradiated by the irradiation-side polarization plate to form a color image. The cross dichroic prism 43 has a substantially planarly-viewed square profile by attaching four right-angle prisms, and dielectric multi-layer films are formed on the boundaries adhering the respective right-angle prisms. One of the multi-layer films arranged in a substantially X-shape reflects the red light and the other multi-layer film reflects the blue light, the multi-layer films bending the red light and the blue light to be aligned with the advancing direction of the green light, thereby combining the three color lights.

The color image irradiated by the cross dichroic prism 43 is projected by the projection optical system 50 in an enlarged manner to form a large-size image on a screen (not shown).

The above-described light source lamp unit 10 (light source device) is capable of being attached to and detached from the light guide 2, so that the light source lamp unit 10 can be replaced when the light source lamp 11 is exploded or luminance of the lamp is deteriorated on account of life span thereof.

Figure 2:
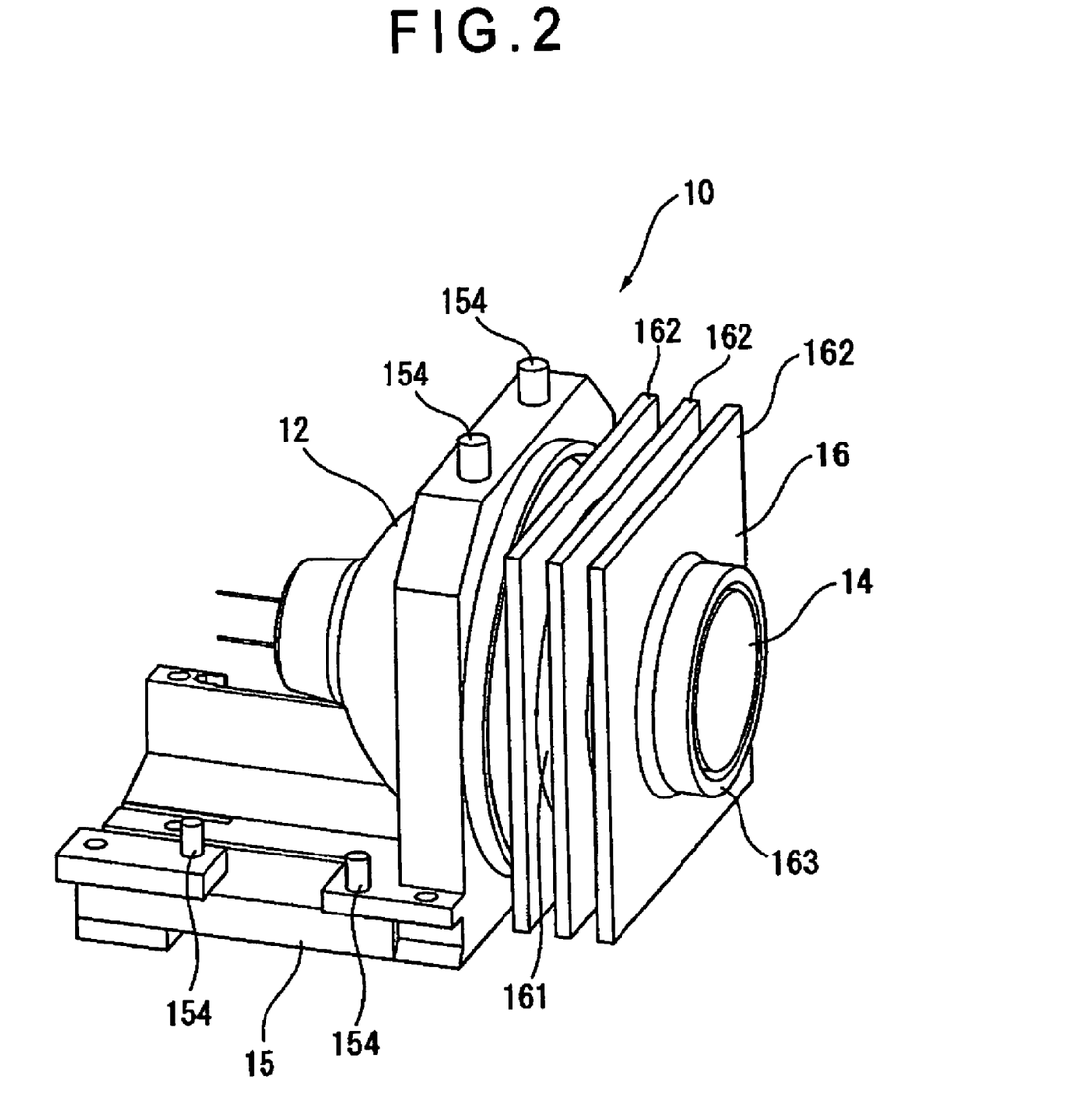
FIG. 2 is a perspective view showing an outline of the structure of a light source device of the aforesaid embodiment.
Figure 3:
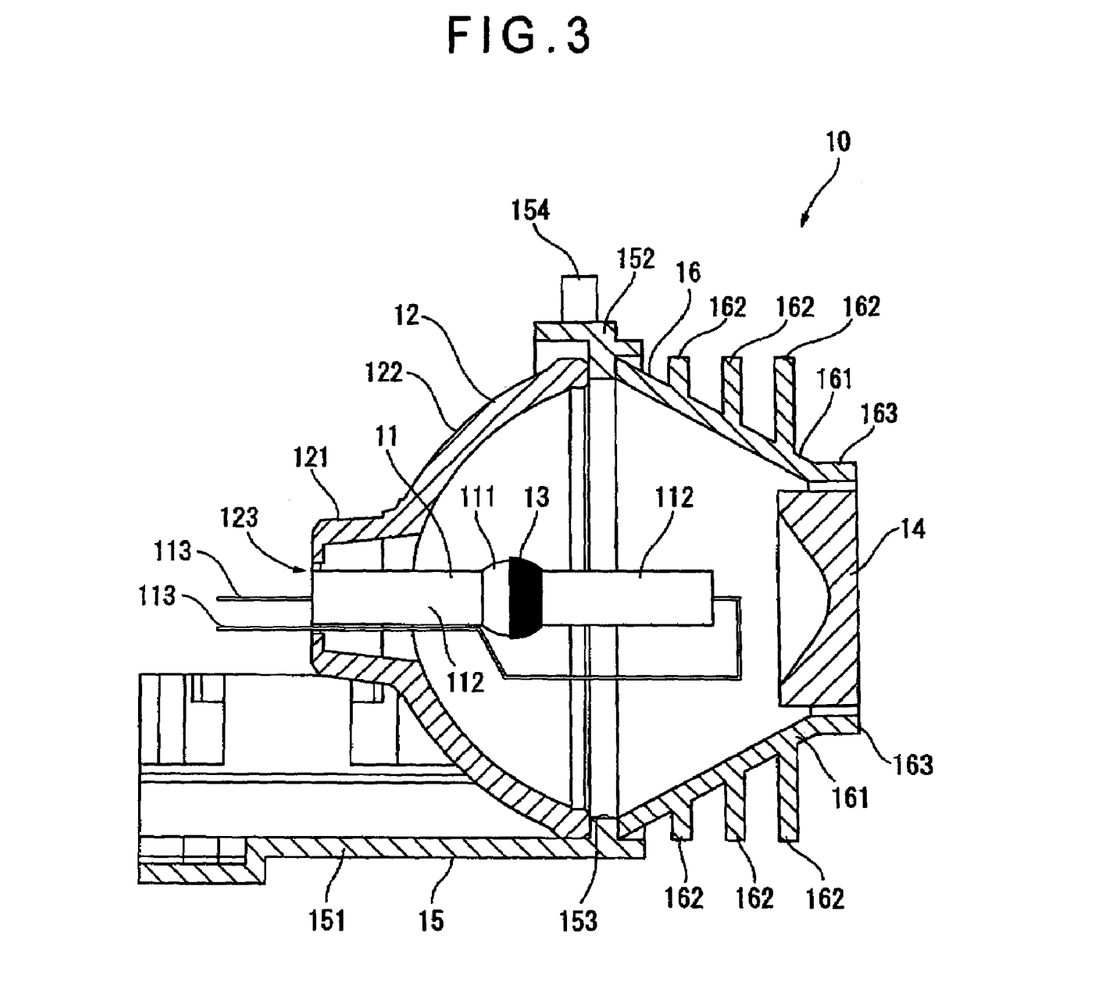
FIG. 3 is a cross sectional view showing the structure of the light source device of the aforesaid embodiment.

Specifically, the light source lamp unit 10 includes a lamp housing 15 and a cover 16 as well as the above-described light source lamp 11, the ellipsoidal reflector 12, the sub-reflection mirror 13 and the parallelizing concave lens 14, as shown in FIGS. 2 and 3.

The light source lamp 11 as a light-emitting tube is constructed by a silica glass tube with the central portion thereof being spherically bulged, the central portion being a light-emitting portion 111 and the portions extending on both sides of the light-emitting portion 111 being sealing portions 112.

Though not illustrated in FIG. 3, a pair of tungsten electrodes spaced apart by a predetermined distance, mercury, rare gas and a small amount of halogen are sealed inside the light-emitting portion 111.

Molybdenum foils electrically connected with the electrodes of the light-emitting portion 111 are inserted in the sealing portions 112 and sealed by glass material etc. Lead wires 113 (electrode-connecting wires) are connected to the molybdenum foils, the lead wires 113 extending toward the outside of the light source lamp 11.

When a predetermined voltage is applied to the lead wires 113, electric discharge is generated between the electrodes so that the light-emitting portion 111 emits light. Though not shown in FIG. 3, a nichrome wire or the like may be winded around the sealing portion 112 on the front side of the light source lamp 11 to preheat the light-emitting portion 111 by applying the current to the nichrome wire when the projector 1 is activated. If such a device for preheating is provided, the light source lamp 11 could be lit more quickly since the halogen cycle is started to work inside the light-emitting portion 111 earlier.

The ellipsoidal reflector 12, which is described below in detail, is a glass integral molding having a neck portion 121 to which the sealing portion 112 of the light source lamp 11 is inserted and a reflecting portion 122 of ellipsoidal curved surface extending from the neck portion 121.

An insertion hole 123 is formed at the center of the neck portion 121, and the sealing portion 112 is disposed at the center of the insertion hole 123.

The reflecting portion 122 is constructed by depositing a metal thin film on the ellipsoidal curved glass surface. The reflecting surface of the reflecting portion 122 is a cold mirror reflecting visible light and transmitting infrared radiation.

Figure 4:
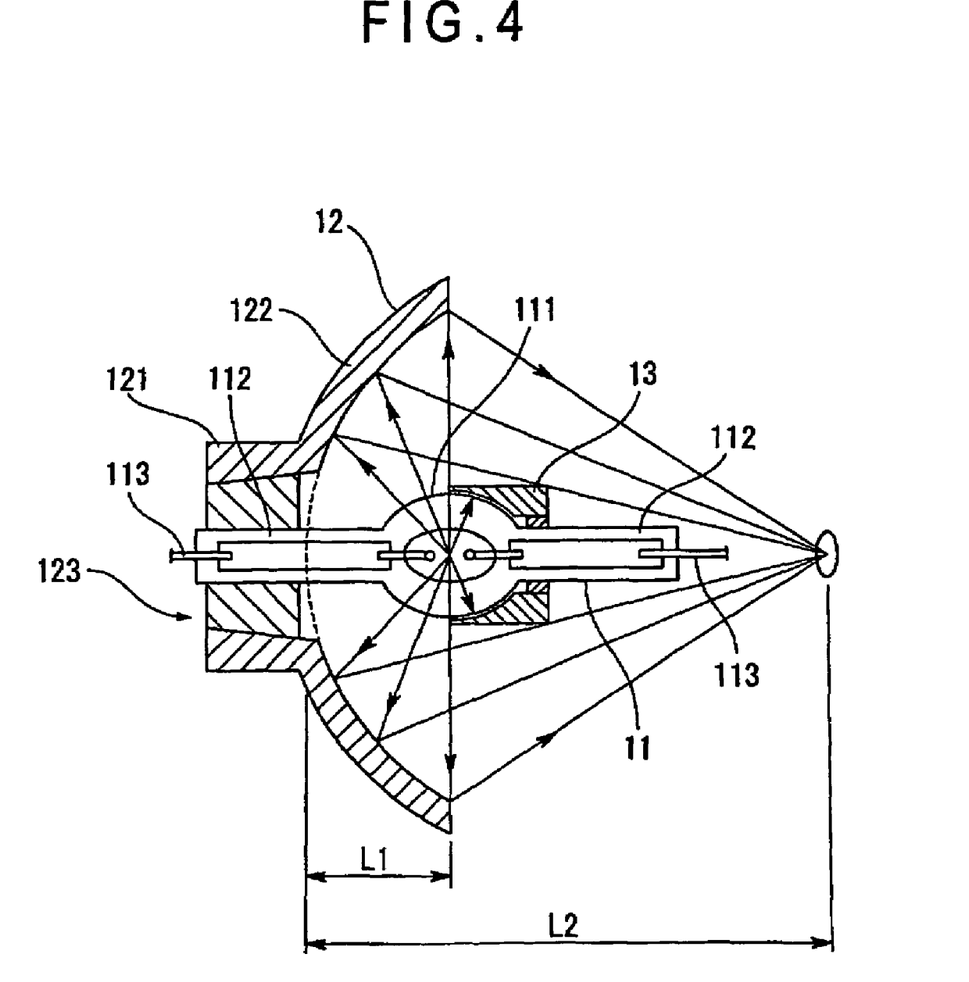
FIG. 4 is a schematic illustration showing how the light beam is emitted by the light source device of the aforesaid embodiment.

As shown in FIG. 4, the light source lamp 11 is disposed inside the reflecting portion 122 so that the light-emitting center between the electrodes inside the light-emitting portion 111 is positioned at a first focal position L1 of the ellipsoidal curved surface of the reflecting portion 122.

When the light source lamp 11 is lit, the light beam emitted by the light-emitting portion 111 is reflected by the reflecting surface of the reflecting portion 122 to be a convergent light converging at a second focal position L2 of the ellipsoidal curved surface of the reflecting portion 122.

The length of the ellipsoidal reflector 12 in the optical axis direction is smaller than that of the light source lamp 11. When the light source lamp 11 is attached to the ellipsoidal reflector 12, the sealing portion 112 on the front side of the light source lamp 11 is projected from a light-irradiation opening of the ellipsoidal reflector 12.

The sub-reflection mirror 13 is a reflecting component covering substantially front half of the light-emitting portion 111 of the light source lamp 11 when assuming that the light-irradiation direction of the reflector 12 is the forward. The reflecting surface is a concave curved surface corresponding to the spherical surface of the light-emitting portion 111 and, though not shown, the reflecting surface thereof is arranged as a cold mirror in the same manner as the ellipsoidal reflector 12.

By attaching the sub-reflection mirror 13 to the light-emitting portion 111, the light beam irradiated to the front side of the light-emitting portion 111 is reflected toward the ellipsoidal reflector 12 by the sub-reflection mirror 13 to be irradiated from the reflecting portion 122 of the ellipsoidal reflector 12 as shown in FIG. 4.

With the use of the sub-reflection mirror 13, since the light beam irradiated to the front side of the light-emitting portion 111 is reflected to the rear side, the irradiation direction of the light beam irradiated by the light-emitting portion 111 can be aligned even when the area of the ellipsoidal curved surface of the reflecting portion 122 is small, so that the dimension of the ellipsoidal reflector 12 in the optical axis direction can be reduced.

As shown in FIG. 3, the lamp housing 15 is an integral synthetic resin molding with an L-shaped cross section, which has a horizontal section 151 and a vertical section 152.

The horizontal section 151 is engaged with the wall of the light guide 2 to prevent light leakage by hiding the light source lamp unit 10 in the light guide 2. Further, though not illustrated, a terminal block for electrically connecting the light source lamp 11 with an external power source is provided on the horizontal section 151, the terminal block being connected with the lead wires 113 of the light source lamp 11.

The vertical section 152 is for determining the position of the ellipsoidal reflector 12 in the optical axis direction, to which a distal end of the ellipsoidal reflector 12 near the light-irradiation opening is fixed by an adhesive etc. in the present embodiment. An opening 153 for transmitting the light beam irradiated by the ellipsoidal reflector 12 is formed on the vertical section 152.

A projection 154 is formed on the horizontal section 151 and the vertical section 152. The projection 154 is engaged with a recess formed in the light guide 2 so that the light-emitting center of the light source lamp 11 is disposed on the illumination optical axis A of the light guide 2.

The cover 16 is an integral metal molding including a heat-absorber 161 of substantially conic cylinder attached to the opening 153 of the vertical section 152 of the lamp housing 15, a plurality of heat-radiation fins 162 projecting on the outside of the heat absorber 161, and a lens attachment 163 formed on the distal end of the heat absorber 161.

The heat absorber 161 absorbs radiation heat radiated by the light source lamp 11 and the heat of air convecting in the sealed space in the ellipsoidal reflector 12 and the cover 16, the inner surface of the heat absorber 161 being coated with anodized black-aluminum. The substantially conic slanted surface of the heat absorber 161 is parallel to the inclination of the light converged by the ellipsoidal reflector 12 to minimize the light beam irradiated by the ellipsoidal reflector 12 to be irradiated on the inner surface of the heat absorber 161.

The plurality of heat-radiation fins 162 are plate members extending orthogonal to the optical axis of the light source lamp unit 10 and gaps capable of sufficiently passing the cooling air is formed between the respective heat-radiation fins 162.

The lens attachment 163 is constructed by a cylindrical body projecting on the distal end of the heat absorber 161, to which the parallelizing concave lens 14 for parallelizing the convergent light of the ellipsoidal reflector 12 is attached. Incidentally, though not illustrated, the parallelizing concave lens 14 is fixed to the lens attachment 163 by an adhesive etc. When the parallelizing concave lens 14 is attached to the lens attachment 163, the space inside the light source lamp unit 10 is completely sealed so that the broken pieces of the light source lamp 11 do not scatter to the outside even when the light source lamp 11 is exploded.

Figure 5:
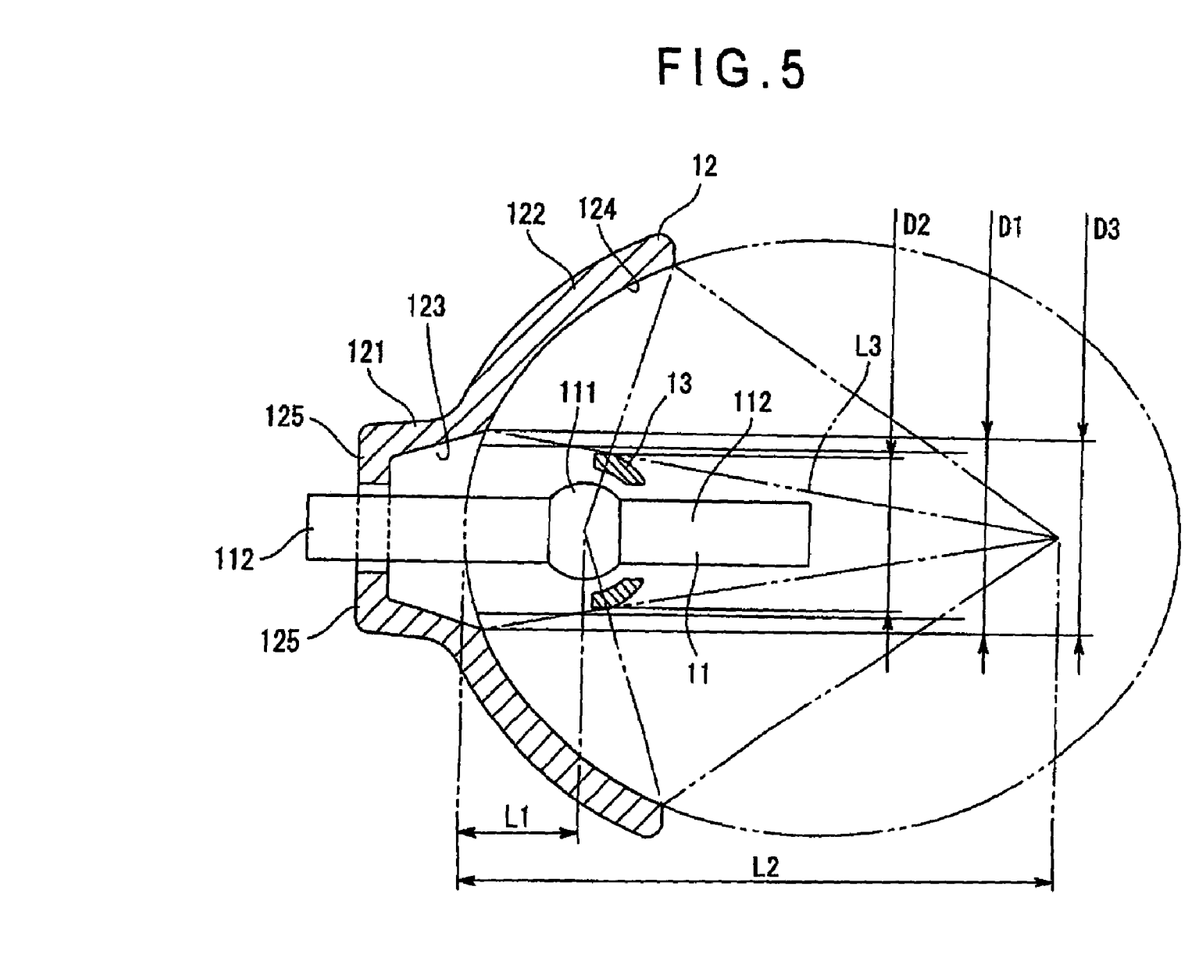
FIG. 5 is a cross sectional view showing the structure of an ellipsoidal reflector of the light source device of the aforesaid embodiment.

Describing about the profile of the above ellipsoidal reflector 12 more in detail, as shown in FIG. 5, the ellipsoidal reflector 12 is characterized by the insertion hole 123 formed inside the neck portion 121. The insertion hole 123 is a conic cylinder with the diameter enlarged from the base end of the neck portion 121 towards the distal end in the light-irradiation direction, a distal end surface of the insertion hole 123 being adjacent to a reflecting surface 124 of the reflecting portion 122.

The relationship of "D1 is less than D3 while greater than or equal to D2", or "D1 is equal to D3 while greater than D2" is established, where D1 is the diameter of the opening adjacent to the reflecting surface 124 of the insertion hole 123; D2 is the external diameter of the sub-reflection mirror 13; and D3 is the internal diameter of the valid reflection area, or a part of the reflecting surface 124 irradiating the light beam not to be shielded by the sub-reflection mirror 13.

The internal diameter D3 of the valid reflection area is the diameter of a circle defined by a nodal line between a cone, which is formed by a light beam L3, i.e., the boundary of the light beam shielded by the sub-reflection mirror 13 out of the light beam reflected by the reflecting surface 124 of the ellipsoidal reflector 12 and condensed to the second focal position L2; and the reflecting surface 124 of the ellipsoidal reflector 12. The region within the cone formed by the light beam L3 is a part where the light beam emitted by the light-emitting portion 111 is shielded by the sub-reflection mirror 13. Thus, the light beam having reached to the region of the reflecting surface 124 within the cone cannot reach the second focal position L2 even when reflected by the reflecting surface 124. Therefore, the reflecting surface 124 of the ellipsoidal reflector 12 is not required to be formed on the region within the circle defined by the internal diameter D3 of the valid reflection area, but the opening diameter of the insertion hole 123 on the side of the reflecting surface 124 may be extended to be equal to the internal diameter D3 of the valid reflection area.

On the base end of the insertion hole 123, a ring-shaped narrowest portion 125 is projected on the inner surface of the insertion hole 123.

The narrowest portion 125 is integrally formed with the neck portion 121, the narrowest portion 125 having a minimal gap necessary for easily inserting the sealing portion 112 of the light source lamp 11 through it.

Figure 6A:
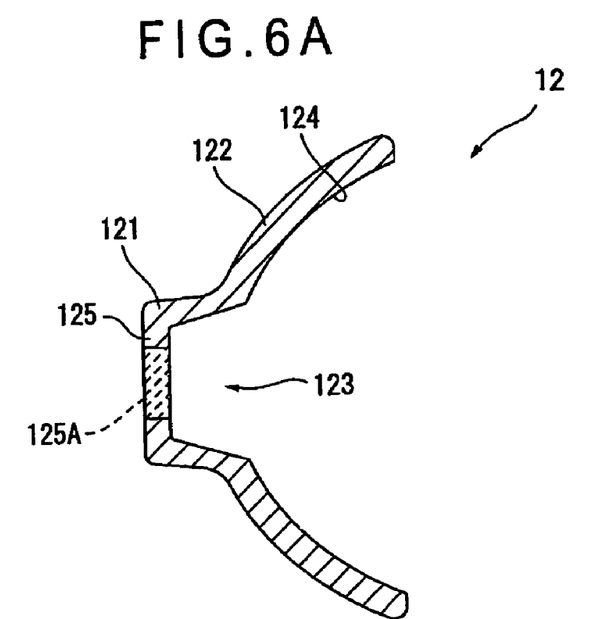
FIG. 6 is a cross sectional view showing the structure of the ellipsoidal reflector of the light source device of the aforesaid embodiment.

After the ellipsoidal reflector 12 is molded with the base end surface of the insertion hole 123 closed with a bottom portion 125A, the narrowest portion 125 is so formed that a hole is made by cutting and grinding the bottom portion 125A as shown in FIG. 6A.

Following steps will be taken when the light source lamp 11 is fixed on the ellipsoidal reflector 12.

Firstly, the ellipsoidal reflector 12 is placed on a workbench or the like with the reflecting surface 124 facing upward, and the sealing portion 112 of the light source lamp 11 is then inserted to the insertion hole 123. At this time, in the state that the sub-reflection mirror 13 is attached to the light-emitting portion 111, the lead wire 113 is bent by approximately 180 degrees, inserted to the insertion hole 123, and extended to the outside from the base end of the insertion hole 123 in advance.

Next, the position of the light source lamp 11 is adjusted so that the light-emitting center of the light-emitting portion 111 is positioned at the first focal position L1 (see FIG. 5) of the reflecting surface 124. With the position adjustment of the light source lamp 11, the image of the electrodes of the light-emitting portion 111 is picked by a CCD camera or the like, the center of the electrodes is obtained, and the position adjustment is carried out so that the obtained center is superposed on the designed first focal position of the ellipsoidal reflector 12.

Figure 6B:
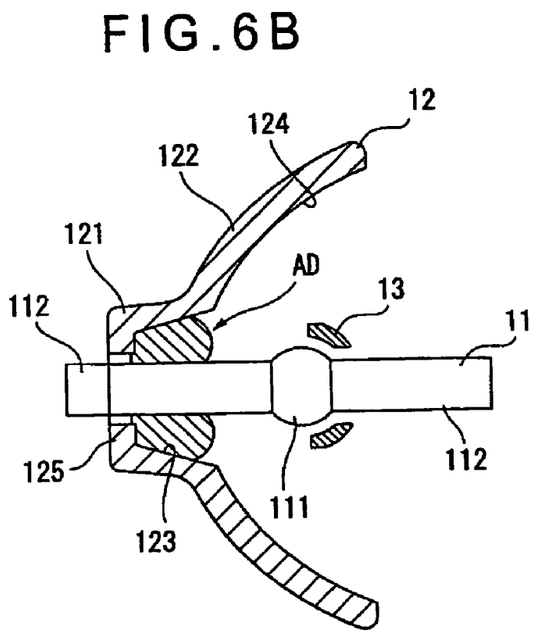

When the position of the light-emitting portion 111 is adjusted, an inorganic adhesive AD is injected inside the insertion hole 123 from the side of the reflecting surface 124 as shown in FIG. 6B. At this time, it is to be noted that the inorganic adhesive AD is injected with the use of a tapered jig such as a funnel, so that the inorganic adhesive will not be adhered on the reflecting surface 124.

When filling of the inorganic adhesive AD is completed, the ellipsoidal reflector 12 and the light source lamp 11 are held by a jig or the like, and the inorganic adhesive AD is then cured while the holding state is maintained.

According to the above-described embodiment, following advantages can be obtained.

(1) For filling the inorganic adhesive AD to the insertion hole 123, since the opening of the insertion hole 123 on the light-irradiation side is large, the inorganic adhesive AD is easily injected from the side of the reflecting surface 124 of the ellipsoidal reflector 12, thus filling the inorganic adhesive AD between the insertion hole 123 and the sealing portion 112. Accordingly, since the inorganic adhesive AD can be filled between the insertion hole 123 and the sealing portion 112 while checking the filling state, the filling is completed without overflow to the reflecting surface 124, thus reducing the possibility of the inorganic adhesive adhering on the reflecting surface 124.

(2) When the inorganic adhesive AD is injected from the side of the reflecting surface 124, the narrowest portion 125 on the side of the base end inhibits the overflow of the inorganic adhesive AD, accordingly further facilitating the filling of the inorganic adhesive AD.

(3) Since the sub-reflection mirror 13 is provided to the light source lamp 11, and the opening of the insertion hole 123 is formed within the range of the diameter C, where the light beam reflected by the reflecting surface 124 of the ellipsoidal reflector 12 is shielded by the sub-reflection mirror 13, the opening becomes larger in size than the range of the diameter D1 where the light beam can be reflected by the reflecting surface 124 without the use of the sub-reflection mirror 13. Accordingly, the size of the opening of the insertion hole 123 on the side of the distal end can be greater than the usual (the situation when the sub-reflection mirror 13 is not provided), thus further easily injecting the inorganic adhesive AD from the side of the reflecting surface 124.

(4) Since the opening diameter of the insertion hole 123 on the side of the reflecting surface 124 can sufficiently be enlarged, the adhesive AD can be filled while checking its filling amount, the adhesive AD can be prevented from overflowing to and adhering on the reflecting surface 124 of the reflecting portion 122 of the reflector 12.

(5) Since the opening diameter of the insertion hole 123 is greater than the external diameter D2 of the sub-reflection mirror 13 while the opening is set within the diameter D3 of the valid reflection area of the reflector 12, the amount of the light beam irradiated by the light source lamp unit 10 would not be reduced due to the reduction in the size of the reflecting surface 124 of the reflector 12.

(6) Since the reflecting surface 124 of the reflecting portion 122 of the reflector 12 would not be damaged on account of the adhesion of the adhesive AD, and the amount of the irradiated light beam would not be reduced, the projector may provide a bright and high-resolution projection image.

Incidentally, the scope of the present invention is not restricted to the above-described embodiment, but includes following modifications.

While the light source lamp unit 10 is used for the projector 1 having the liquid crystal panels 42R, 42G and 42B in the above embodiment, it is not limited thereto. For example, the present invention can be applied to a projector equipped with a device using a micro-mirror. Additionally, the present invention can be applied to an optical equipment other than the projector, for example, to an illuminating equipment such as a spotlight.

Specific configuration and arrangement in implementing the present invention may be designed in any manner as long as an object of the present invention can be achieved.

What is claimed is:

1. A light source device, comprising:
    a light-emitting tube including a light-emitting portion that generates a light beam by an electric discharge between electrodes, and sealing portions provided on both sides of the light-emitting portion; and
    a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion to align the light beam in a predetermined direction,
    the light-emitting tube having a sub-reflection mirror that covers substantially a front half of the light-emitting portion, the insertion hole having a diameter that is enlarged from the base end thereof toward a distal end in a light irradiation direction, the opening diameter of the insertion hole on the side of the reflecting surface being greater than the external diameter of the sub-reflection mirror while the opening diameter is within the internal diameter of a valid reflection area of the reflector, the internal diameter being defined by a front focal position of the reflector and the outer periphery of the sub-reflection mirror, and the internal diameter of the valid reflection area of the reflector being a diameter of a circle defined by a nodal line between the reflection surface of the reflector and a cone which is formed by the boundary of the light beam shielded by the sub-reflection mirror out of the light beam reflected by the reflecting surface of the reflector and condensed to the front focal position of the reflector.

2. A projector comprising:

a light source device;

an optical modulator that modulates a light beam irradiated by the light source device in accordance with image information to form an optical image; and a projection optical device that projects the optical image formed by the optical modulator in an enlarged manner, wherein the light source device comprising:

a light-emitting tube including a light-emitting portion that generates a light beam by an electric discharge between electrodes, and sealing portions provided on both sides of the light-emitting portion; and a reflector including a neck portion provided with an insertion hole to which the light-emitting tube is inserted, and a reflecting portion integrally formed with the neck portion and having an ellipsoidal curved reflecting surface that irradiates the light beam emitted by the light-emitting portion to align the light beam in a predetermined direction, the light-emitting tube having a sub-reflection mirror that covers substantially front half of the light-emitting portion, the insertion hole having a diameter that is enlarged from the base end thereof toward the distal end in a light irradiation direction, the opening diameter of the insertion hole on the side of the reflecting surface being greater than the external diameter of the sub-reflection mirror while the opening diameter is within the internal diameter of a valid reflection area of the reflector, the internal diameter being defined by a front focal position of the reflector and the outer periphery of the sub-reflection mirror, and the internal diameter of the valid reflection area of the reflector being a diameter of a circle defined by a nodal line between the reflection surface of the reflector and a cone which is formed by the boundary of the light beam shielded by the sub-reflection mirror out of the light beam reflected by the reflecting surface of the reflector and condensed to the front focal position of the reflector.

* * * * *